(12) United States Patent
Yamaguchi

(10) Patent No.: US 11,417,249 B2
(45) Date of Patent: Aug. 16, 2022

(54) PROJECTION IMAGE APPARATUS AND METHOD OF CONTROLLING THE SAME

(71) Applicant: Panasonic Intellectual Property Management Co., Ltd., Osaka (JP)

(72) Inventor: Akiyoshi Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/226,760

(22) Filed: Apr. 9, 2021

(65) Prior Publication Data

US 2021/0335159 A1 Oct. 28, 2021

(30) Foreign Application Priority Data

Apr. 28, 2020 (JP) .............................. JP2020-079720

(51) Int. Cl.
*G09G 3/00* (2006.01)
*H04N 9/31* (2006.01)

(52) U.S. Cl.
CPC ............ *G09G 3/002* (2013.01); *G09G 3/007* (2013.01); *H04N 9/3141* (2013.01); *H04N 9/3188* (2013.01); *G09G 2340/0407* (2013.01)

(58) Field of Classification Search
None
See application file for complete search history.

(56) References Cited

U.S. PATENT DOCUMENTS

| 2006/0109539 A1* | 5/2006 | Katoh | G09G 3/346 359/291 |
| 2007/0126989 A1* | 6/2007 | Pate | G03B 21/00 353/31 |
| 2008/0284763 A1* | 11/2008 | Someya | G09G 3/007 345/204 |
| 2019/0108779 A1 | 4/2019 | Kurita | |

FOREIGN PATENT DOCUMENTS

| JP | 2005-57457 | 3/2005 |
| JP | 2005-77956 | 3/2005 |
| JP | 2006-345550 | 12/2006 |
| JP | 2015-176019 | 10/2015 |
| JP | 2016-111443 | 6/2016 |
| JP | 2019-66806 | 4/2019 |

* cited by examiner

*Primary Examiner* — Matthew Yeung
(74) *Attorney, Agent, or Firm* — Wenderoth, Lind & Ponack L.L.P.

(57) ABSTRACT

A projection image apparatus includes an image display element that generate image light according to an input image signal, a transparent parallel plain plate that is swing-drive-controlled about one or two of two axes, the transparent parallel plain plate changing an optical path of the image light to perform pixel shift about the one or two of the two axes, a resampling processor that performs resampling process for the input image signal, and a controller that selectively executes one of the following three actions in response to a number of pixels and a frame rate of the input image signal, (1) to avoid the resampling process and the pixel shift, (2) the resampling process related to pixel shift about the one axis and pixel shift about the one axis, and (3) the resampling process related to pixel shift about the two axes and pixel shift about the two axes.

4 Claims, 14 Drawing Sheets

FIG. 8

| | 0 | 1 | 2 | 3 | 4 | 5 |
|---|---|---|---|---|---|---|
| 0 | 100 | 200 | 110 | 210 | 120 | 220 |
| 1 | 400 | 300 | 410 | 310 | 420 | 320 |
| 2 | 101 | 201 | 111 | 211 | 121 | 221 |
| 3 | 401 | 301 | 411 | 311 | 421 | 321 |

Column number (3840)
Line number (2160)

FIG. 14

PROJECTION IMAGE APPARATUS AND METHOD OF CONTROLLING THE SAME

BACKGROUND

1. Technical Field

The present disclosure relates to a projection image apparatus such as a projector and a method of controlling the device.

2. Description of the Related Art

A projection image apparatus according to the prior art determines if an image signal is for quick motion video, if the spatial frequency of the entire image is uniform, or if the spatial frequency of part of the image is high, and turns off pixel shift for quick motion video or for a uniform spatial frequency; turns on for slow motion video or for a high spatial frequency (refer to Patent Literature (PTL) 1 for example). This action provides an image of optimally high resolution for various types of image signals with low power consumption.

PTL 1 is Japanese Patent Unexamined Publication No. 2006-345550.

SUMMARY

A projection image apparatus according to the prior art, however, may repeat turning on and off of pixel shift depending on the type of an image signal, which unfortunately causes a viewer to feel unnatural due to change of resolution depending on a scene. Note that pixel shift is also called wobbling or pixel moving.

The present disclosure provides a projection image apparatus and its control method that prevent an unnatural image from being displayed even if the motion speed or the spatial frequency changes depending on a scene.

A projection image apparatus according to the present disclosure includes
an image display element that modulates illumination light from a light source according to an input image signal to generate image light,
a transparent parallel plain plate that is swing-drive-controlled about one or two of two axes orthogonal to each other, the transparent parallel plain plate changing an optical path of the image light from the image display element to perform pixel shift about the one or two of the two axes for the image light,
a projection optical system that enlarge-projects the image light having passed through the transparent parallel plain plate,
a resampling processor that performs resampling process for the input image signal, and
a controller that selectively executes one of the following three actions in response to a number of pixels and a frame rate of the input image signal:
(1) causing the resampling processor to avoid the resampling process for the input image signal and also causing the transparent parallel plain plate to avoid the pixel shift for the image light,
(2) making the resampling processor execute the resampling process related to pixel shift about the one axis for the input image signal and also controlling the transparent parallel plain plate to perform pixel shift about the one axis for the image light, and
(3) making the resampling processor execute the resampling process related to pixel shift about the two axes for the input image signal and also controlling the transparent parallel plain plate to perform pixel shift about the two axes for the image light.

Thus, a projection image apparatus according to the present disclosure selectively controls the transparent parallel plain plate to perform one of the following: (1) no pixel shift, (2) 1-axis pixel shift, and (3) 2-axes pixel shift, for image light in response to the number of pixels and frame rate of an input image signal. This control prevents an unnatural image from being displayed even if the motion speed or the spatial frequency changes depending on a scene.

BRIEF DESCRIPTION OF DRAWINGS

FIG. 8 is a schematic diagram illustrating a configuration example of an input image signal that is input to image processing circuit 420 in FIG. 2.

FIG. 14 is a tabular-form schematic diagram illustrating an execution example of the pixel shift control process in FIG. 13.

DETAILED DESCRIPTION

Hereinafter, a detailed description is made of an embodiment with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure, and it is not intended that the drawings and the description limit the subjects described in the claims.

Inventor's Findings

In the prior art, turning on and off of the pixel shift process may be repeated depending on the type of an image signal as described above, which unfortunately causes a viewer to feel unnatural due to change of resolution depending on a scene.

To solve this problem, the embodiment according to the present disclosure features that one of the three patterns is selected in response to the number of pixels and frame rate of an input image signal: (1) turning off the pixel shift process, (2) performing the pixel shift process about one axis, and (3) performing the pixel shift process about two axes.

Embodiment

Hereinafter, a description is made of an embodiment using FIGS. 1 through 14.

Configuration of Projection Optical System of Projector

Figure 1:
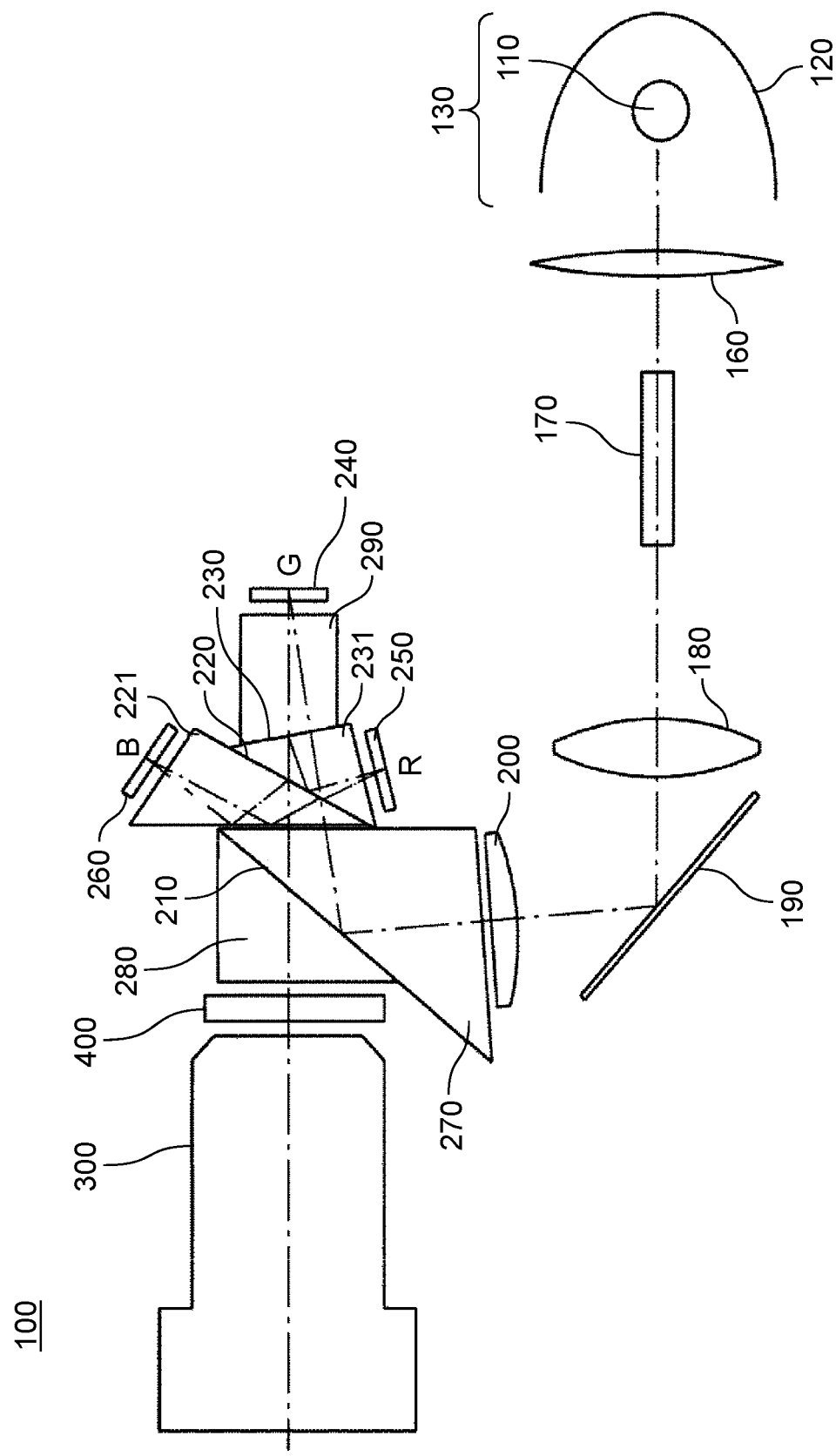
FIG. 1 is a schematic diagram illustrating a configuration example of the projection optical system of projector 100 according to an embodiment.

FIG. 1 is a schematic diagram illustrating a configuration example of the projection optical system of projector 100, which is an example of a projection image apparatus according to the embodiment. Hereinafter, a description is made of the configuration of the projection optical system of projector 100 in reference to FIG. 1.

In FIG. 1, projector 100 includes light source 130 composed of light-emitting tube 110; and reflector 120 that reflects white light emitted from light-emitting tube 110. Light-emitting tube 110 emits white light flux containing red, green, and blue light with wavelength bands different from one another. Light-emitting tube 110 is an extra high pressure mercury lamp or a metal halide lamp for example. Reflector 120 reflects light flux emitted from light-emitting tube 110 disposed at one focal position and discharges the light flux toward the front as parallel light.

White light from light source 130 is input to the illumination optical system. The illumination optical system has lens 160, rod 170, lens 180, and mirror 190. The illumination optical system introduces light flux emitted from light source 130 to digital mirror devices (referred to as DMD hereinafter) 240, 250, and 260 as illumination light. Rod 170 is a columnar glass member that totally reflects light internally. Light flux emitted from light source 130 reflects more than once inside rod 170. Resultingly, the optical intensity distribution in the light-outgoing surface of rod 170 becomes substantially uniform.

Lens 180 is a relay lens that image-forms light flux on the light-outgoing surface of rod 170 onto DMDs 240, 250, and 260. Mirror 190 reflects light flux having passed through lens 180. The light flux having been reflected enters field lens 200. Field lens 200 converts light having entered into substantially parallel light flux. The light flux having passed through field lens 200 enters the total reflection prism.

The total reflection prism is composed of prisms 270 and 280. There is air layer 210 at the adjacent surface between prism 270 and prism 280. Air layer 210 is a thin air layer. Air layer 210 totally reflects light flux entering at the critical angle or greater. The totally reflected light flux enters the color prism.

The color prism is composed of prisms 221, 231, and 290. There is dichroic coat 220 that reflects blue light provided at the adjacent surface between prism 221 and prism 231. Also, there is dichroic coat 230 that reflects red light provided at the adjacent surface between prism 231 and prism 290. The color prism is deployed with DMDs 240, 250, and 260.

DMDs 240, 250, and 260 have 1,920×1,080 pieces of micro mirrors. DMDs 240, 250, and 260 deflect the micro mirrors in response to an image signal. Resultingly, DMDs 240, 250, and 260 separate light into that made to enter projection optical system 300 and that reflected to the outside of the effective range of projection optical system 300 in response to an image signal to modulate light made to enter the DMDs. Note that green light enters DMD 240; red light, DMD 250; and blue light, DMD 260.

Of light flux reflected on DMDs 240, 250, and 260, that entering projection optical system 300 is synthesized at the color prism. The light flux synthesized enters the total reflection prism. The light flux having entered the total reflection prism enters air layer 210 at the critical angle or less. Accordingly, this light flux passes through air layer 210 and enters projection optical system 300.

Projection optical system 300 is an optical system for magnifying light flux having entered. Projection optical system 300, having a focus function and a zoom function, projects image light from a DMD onto a projection surface to display the image on the projection surface.

Projector 100, disposed in a plane vertical to the optical axis of the projection optical system, includes parallel plain-plate glass 400 (an example of a transparent parallel plain plate) as an optical element capable of the following operation. Projector 100 operates this parallel plain-plate glass 400 to displace a display position on the screen (i.e., a projection surface on which pixels forming an image generated by a DMD is projected) by an interval of the pixel pitch or shorter. This operation allows projector 100 to project an image with a high resolution.

Configuration Between Prism and Projection Lens

Next, a description is made of image processing circuit 420 and optical element drive device 430 for driving parallel plain-plate glass 400 disposed between a prism block composed of a total reflection prism and a color prism; and projection optical system 300.

Figure 2:
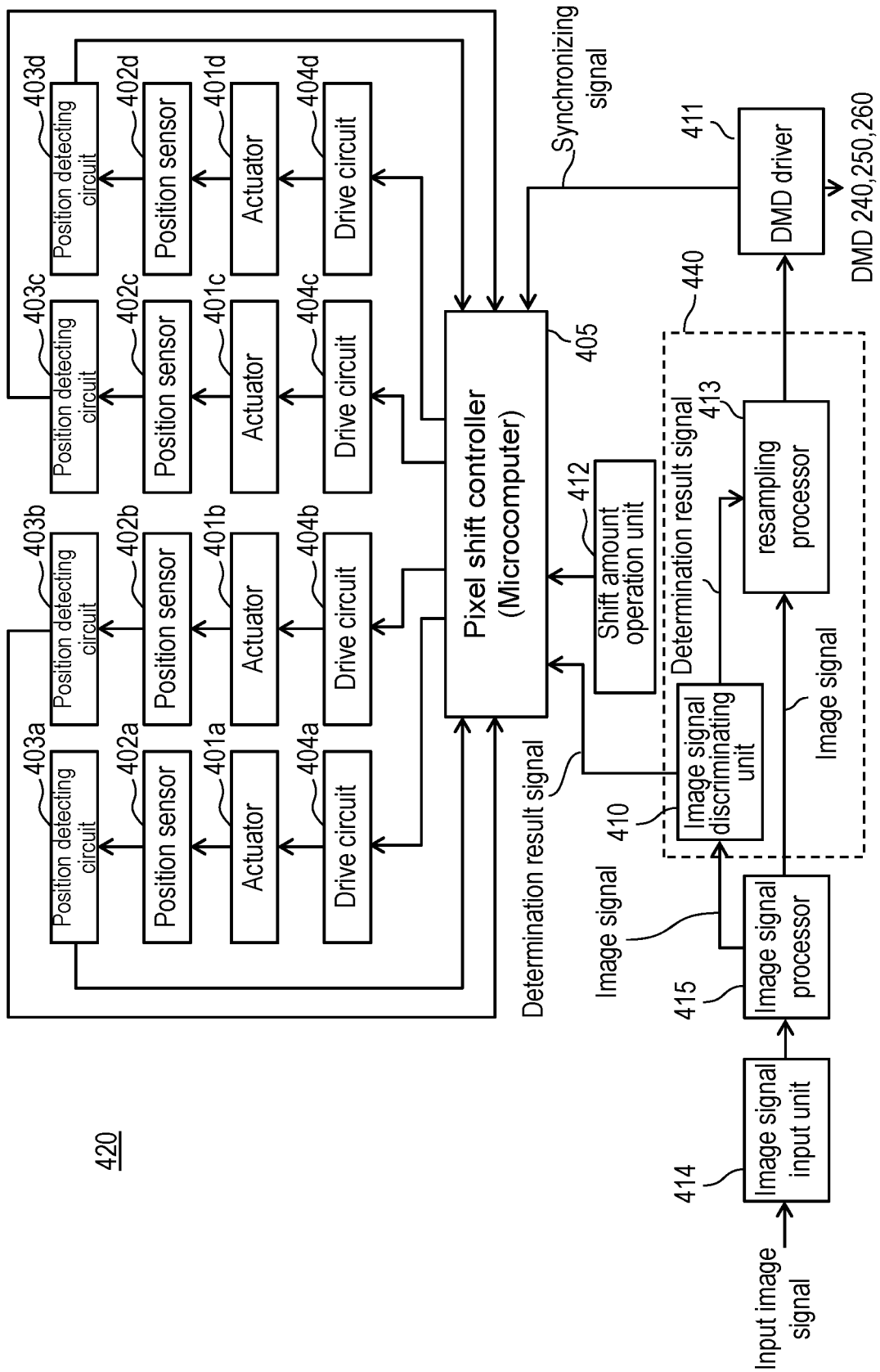
FIG. 2 is a schematic diagram illustrating a configuration example of image processing circuit 420 of projector 100 in FIG. 1.
Figure 3:
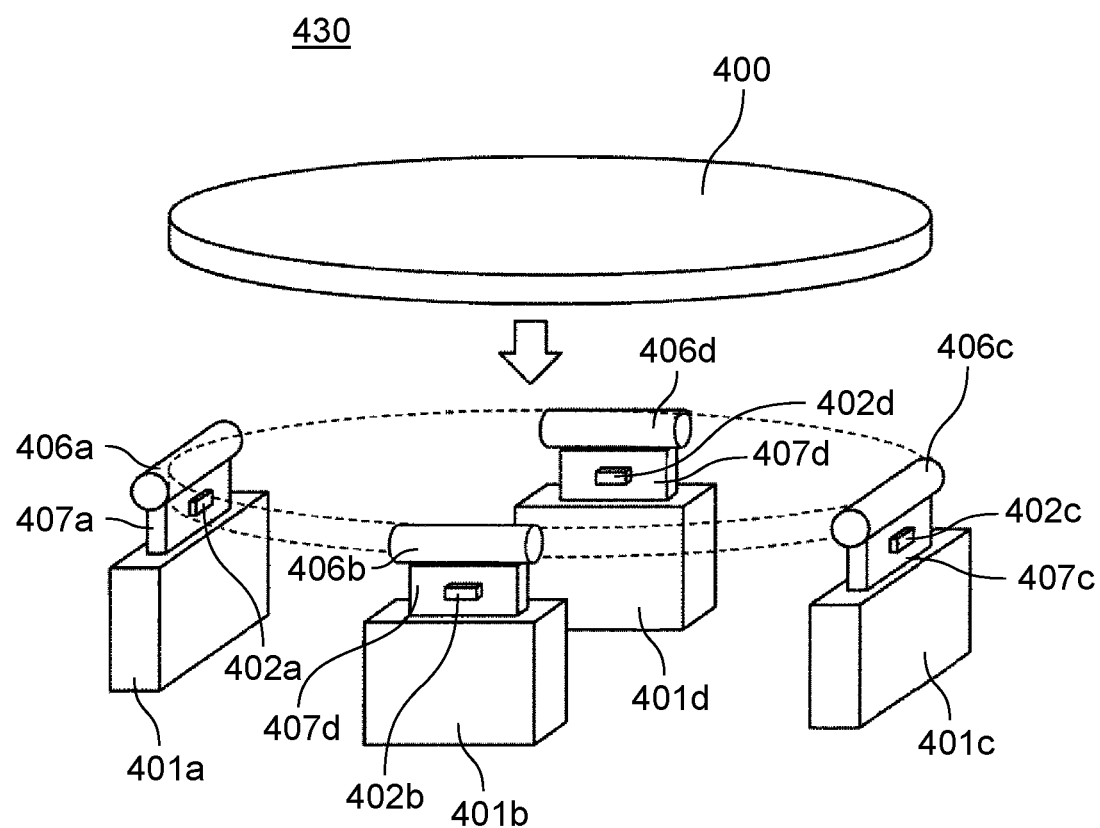
FIG. 3 is a schematic diagram illustrating a configuration example of optical element drive device 430 of projector 100 in FIG. 1.

FIG. 2 is a schematic diagram illustrating a configuration example of image processing circuit 420 of projector 100 in FIG. 1. FIG. 3 is a schematic diagram illustrating a configuration example of optical element drive device 430 of projector 100 in FIG. 1. Note that image processing circuit 420 shown in FIG. 2, except for external devices such as a personal computer (PC) connected to the circuit, is deployed inside projector 100.

In this embodiment, parallel plain-plate glass 400 that is flat and circular is used as an optical element. In FIGS. 2 and 3, the end of parallel plain-plate glass 400 is connected to movable parts 407a, 407b, 407c, and 407d (collectively referred to as movable part 407) of four actuators 401a, 401b, 401c, and 401d (collectively referred to as actuator 401) by means of joint member 406a, 406b, 406c, and 406d (collectively referred to as joint member 406), respectively.

Figure 4:
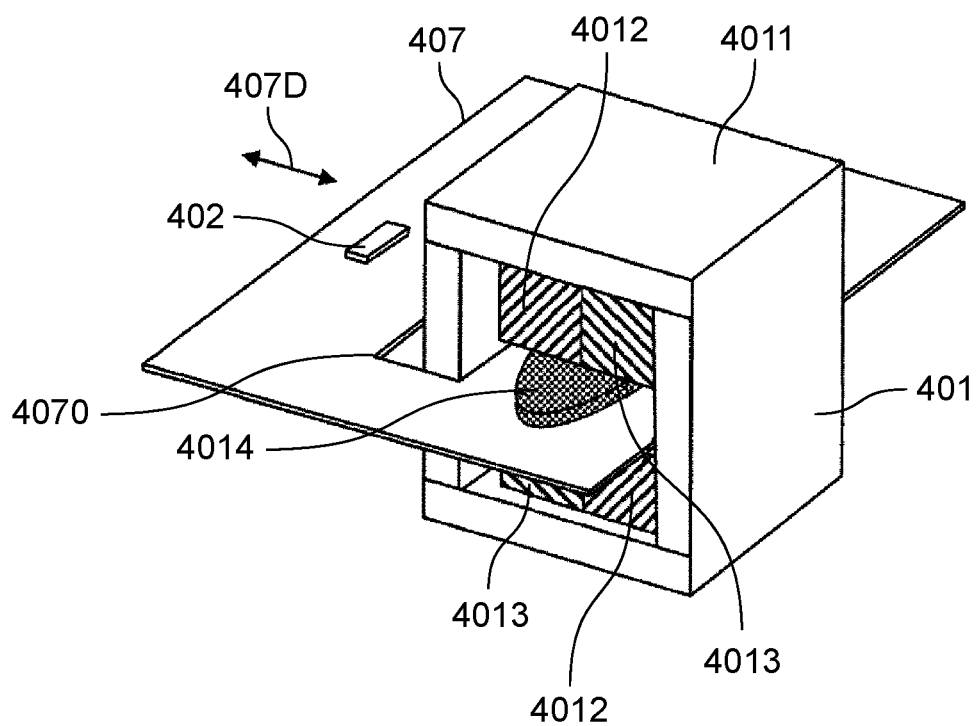
FIG. 4 is a schematic diagram illustrating a configuration example of actuator 401 of optical element drive device 430 in FIG. 3.

FIG. 4 is a schematic diagram illustrating a configuration example of actuator 401 of optical element drive device 430 in FIG. 3. In this embodiment, a voice coil motor (VCM) is used as an example of actuator 401. In FIG. 4, permanent magnets (permanent magnet 4012 with the N pole and permanent magnet 4013 with the S pole) are disposed so as to face each other at a given distance inside square-shaped yoke 4011. There is movable part 407 disposed between permanent magnets 4012 and 4013.

There is guide window 4070 opened in movable part 407. Yoke 4011 is inserted into this guide window 4070. Coil 4014 provided on movable part 407 is deployed between permanent magnets 4012 and 4013 disposed facing each other. A drive signal current flowing through coil 4014 causes movable part 407 to move in the 1-axis direction of arrow 407D. This movable part 407 moves from the reference position in the positive or negative direction in response to the amount of a signal current flowing through coil 4014. The moving distance of movable part 407 is measured by position detecting circuits 403a to 403d shown in FIG. 2 that detect position sensor 402 attached to movable part 407. There is a slight gap between movable part 407 to which coil 4014 is attached; and permanent magnets 4012 and 4013. Accordingly, movable part 407 can move by a distance allowed by the slight gap even if undergoing a force vertical to the 1-axis direction driven by a drive signal current, which allows movable part 407 to incline.

Figure 6:
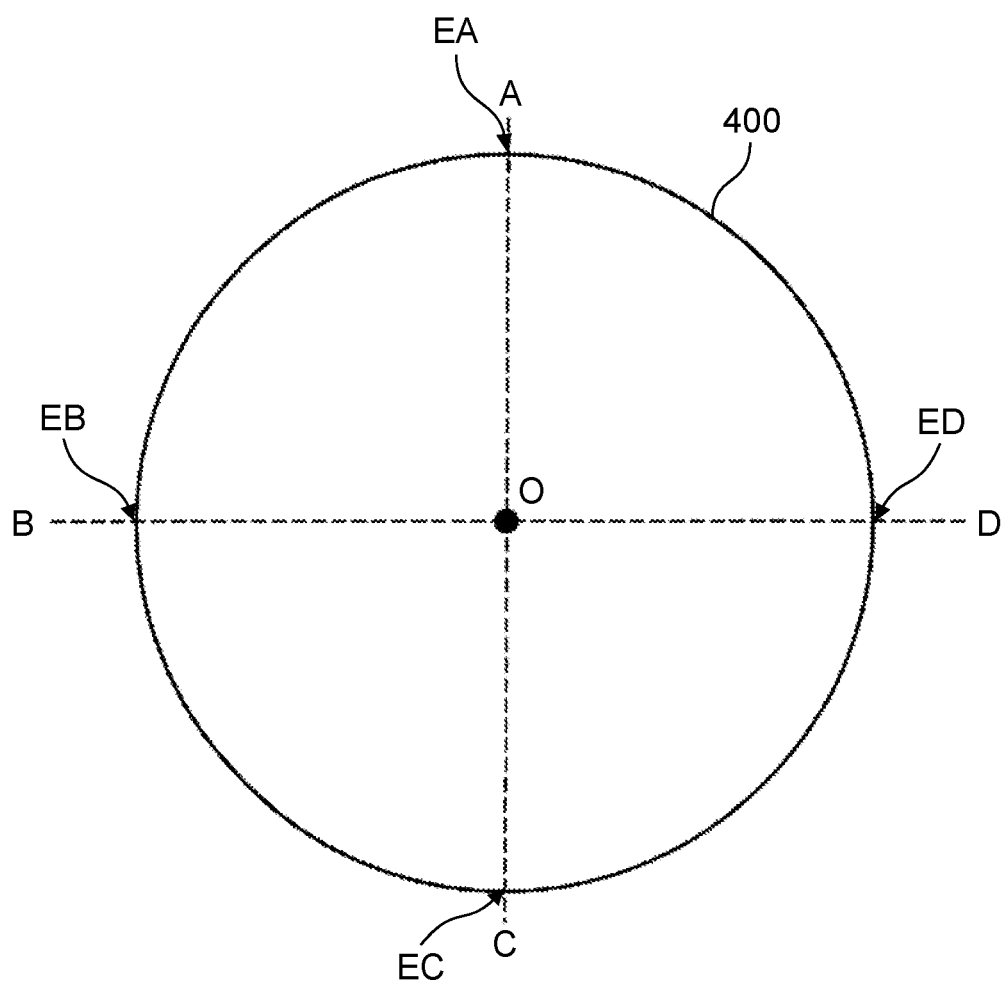
FIG. 6 is a plan view of parallel plain-plate glass 400 in FIG. 1.

As shown in FIG. 6, joint member 406 to which movable part 407 of actuator 401 is joined is connected to central ends EA, EB, EC, and ED of the respective sides on axis A-C and axis B-D orthogonal to each other at center O of parallel plain-plate glass 400.

In FIG. 2, four actuators 401a to 401d are driven by drive circuits 404a, 404b, 404c, and 404d controlled by control signals from pixel shift controller 405. Actuators 401a to 401d are driven by a drive signal current from drive circuits 404a to 404d so that movable parts 407a to 407d move back and forth in the 1-axis direction. The positions of movable parts 407a to 407d are detected by position detecting circuits 403a to 403d that detect position sensors 402a to 402d provided on the respective movable parts. Detection output from position detecting circuits 403a to 403d is input to pixel shift controller 405. Pixel shift controller 405 always monitors the positions of movable parts 407a to 407d of actuators 401a to 401d to servo-control actuators 401a to 401d.

In FIG. 2, an input image signal is input to image signal input unit 414. Image signal input unit 414 temporarily stores the input image signal in its built-in buffer memory, and then outputs the signal to image signal processor 415. Image signal processor 415 executes given image signal processes such as scaling, color correction, and frame rate control (FRC) for the input image signal, and then outputs the resulting image signal to image signal discriminating unit 410 and resampling processor 413. Note that image signal discriminating unit 410 and resampling processor 413 are implemented inside control circuit 440 such as a field-programmable gate array (FPGA).

Pixel shift controller 405 and control circuit 440 execute the pixel shift control process in FIG. 13 (described later) based on the number of pixels (resolution) and frame rate of a subframe image signal having been input. Here, image signal discriminating unit 410 determines whether or not to execute the 1-axis or 2-axes pixel shift process based on the number of pixels (resolution) and frame rate of a subframe image signal having been input using the criteria in table 1 below for example, and outputs a determination result signal indicating the result to pixel shift controller 405 and resampling processor 413. Note that "RESsignal" shown in table 1 represents the resolution or the number of pixels (the horizontal number of pixels×the vertical number of pixels, the same applies to the following) of an input image signal, and "RESdmd" represents the resolution or the number of pixels of DMDs 240, 250, and 260.

TABLE 1

|  | FR ≤ 60 fps | FR = 96~120 fps | FR ≥ 192 fps |
| --- | --- | --- | --- |
| RESsignal > RESdmd | 2-axes pixel shift | 1-axis pixel shift | Cannot be displayed |
| RESsignal = RESdmd | No pixel shift | No pixel shift | No pixel shift |
| RESsignal < RESdmd | No pixel shift | No pixel shift | No pixel shift |

Concretely, pixel shift controller 405 generates synchronizing signals sent to drive circuits 404a to 404d in response to the number of pixels (resolution) and frame rate of a subframe image signal having been input based on a synchronizing signal generated by DMD driver 411.

Furthermore, the moving distance of movable parts 407a to 407d of actuators 401a to 401d is adjusted as a result that a signal indicating an adjustment amount is input to pixel shift controller 405 due to an operation of shift amount operation unit 412 and pixel shift controller 405 controls drive circuits 404a to 404d. Shift amount operation unit 412 may be an operation key provided on the main body of projector 100 or a key allocated to a remote controller for operating projector 100, for example.

Figure 5:
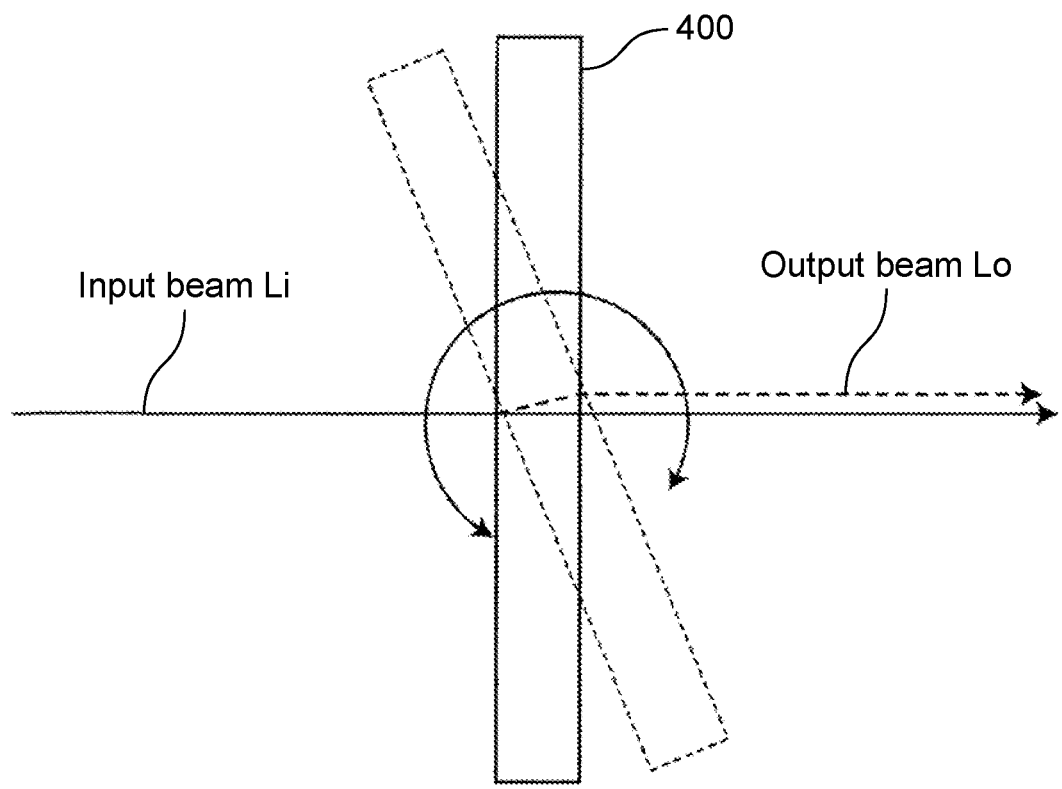
FIG. 5 is a schematic diagram for illustrating the principle of changing the optical path by parallel plain-plate glass 400 in FIG. 1.

FIG. 5 is a schematic diagram for illustrating the principle of changing an optical path by parallel plain-plate glass 400 in FIG. 1.

As shown in FIG. 5, when the surface of parallel plain-plate glass 400 is orthogonal to input beam Li, input beam Li is not refracted at an interface between parallel plain-plate glass 400 and air but travels in a straight line. The input beam passes through parallel plain-plate glass 400 without being refracted, and even at the interface where the beam is exposed to air, the beam is not refracted but travels in a straight line because parallel plain-plate glass 400 is a parallel plane plate and the beam and the interface are orthogonal to each other. Accordingly, if the input beam is image light, the image does not move (shift).

Meanwhile, when parallel plain-plate glass 400 is not orthogonal to an input beam as indicated by the broken line in FIG. 5, the input beam is refracted at the interface between parallel plain-plate glass 400 and air. After input beam Li is refracted and enters parallel plain-plate glass 400, input beam Li passes through parallel plain-plate glass 400, and even at the interface where the beam is exposed to air, the beam is refracted because parallel plain-plate glass 400 is a parallel plane plate and the beam and the interface are not orthogonal to each other.

The angle at which input beam Li is refracted when entering parallel plain-plate glass 400 is equal to the angle at which input beam Li is refracted when outgoing from parallel plain-plate glass 400. Accordingly, if input beam Li is image light, the image light of output beam Lo is parallel-translated in the gradient direction of parallel plain-plate glass 400. This translation causes the display position of an image output from parallel plain-plate glass 400 and projected to move (shift).

Figure 7:
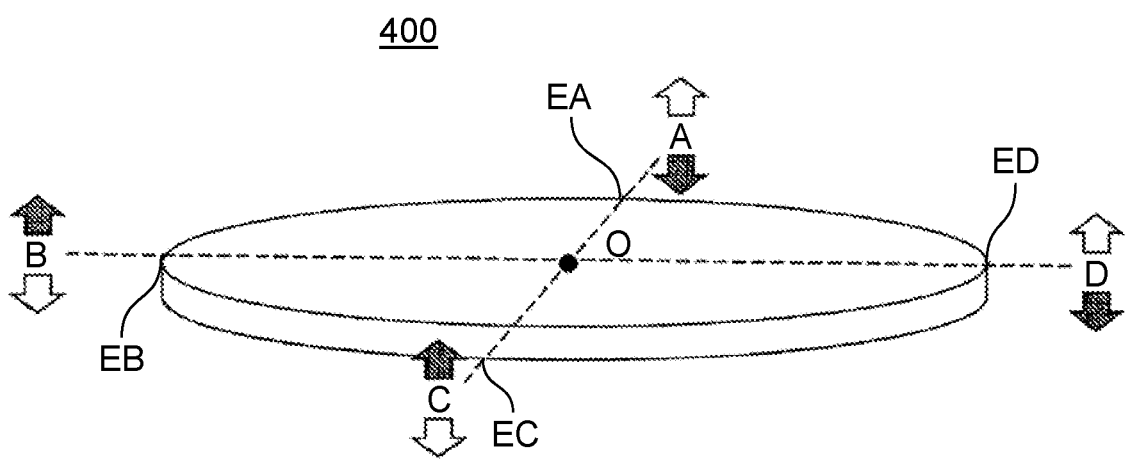
FIG. 7 is a schematic diagram for illustrating the operation of parallel plain-plate glass 400 in FIG. 1.

FIG. 6 is a plan view of parallel plain-plate glass 400 in FIG. 1. FIG. 7 is a schematic diagram for illustrating the operation of parallel plain-plate glass 400 in FIG. 1.

Using the above-described principle as shown in FIG. 6, ends EA, EB, EC, and ED on axis A-C and axis B-D orthogonal to each other passing through center O of parallel plain-plate glass 400 are swingably connected to movable parts 407a, 407b, 407c, and 407d, respectively by means of the joint members of actuators 401a, 401b, 401c, and 401d. Then, by driving actuators 401a to 401d, end EA can be moved upward by a given distance with axis B-D being the center of the rotation axis to move end EC downward by a given distance, as well as end EB can be moved downward by a given distance with axis A-C being the center of the rotation axis to move end ED upward by a given distance, while keeping the position of center O unchanged, for example as shown in FIG. 7. This operation changes the optical path of image light entering parallel plain-plate glass 400 to display pixels at a given position. From this state, each end is vertically controlled in the same way to move the display position of pixels (pixel shift).

Resampling processor 413 generates a subframe image signal for two or four subframes corresponding to the movement of the projection position by the optical element drive device for each frame of an image signal having been input based on a determination result signal having been input, and then outputs the subframe image signal to DMD driver 411. Note that the number of pixels of a subframe image signal is same as those corresponding to DMDs 240, 250, and 260.

Action of Outputting Double-Density Image

Pixel shift controller 405 generates synchronizing signals sent to drive circuits 404a to 404d from a subframe signal for two subframes generated by resampling processor 413 based on a synchronizing signal generated by DMD driver 411. DMD driver 411 generates a DMD drive signal so as to output a subframe signal for two subframes generated by resampling processor 413 at a speed twice the output frame rate. Drive circuits 404a to 404d of actuators 401a to 401d drive actuators 401a to 401d in synchronization with DMD driver 411, and generate an actuator drive signal so as to move the projection position of pixels.

Figure 9:
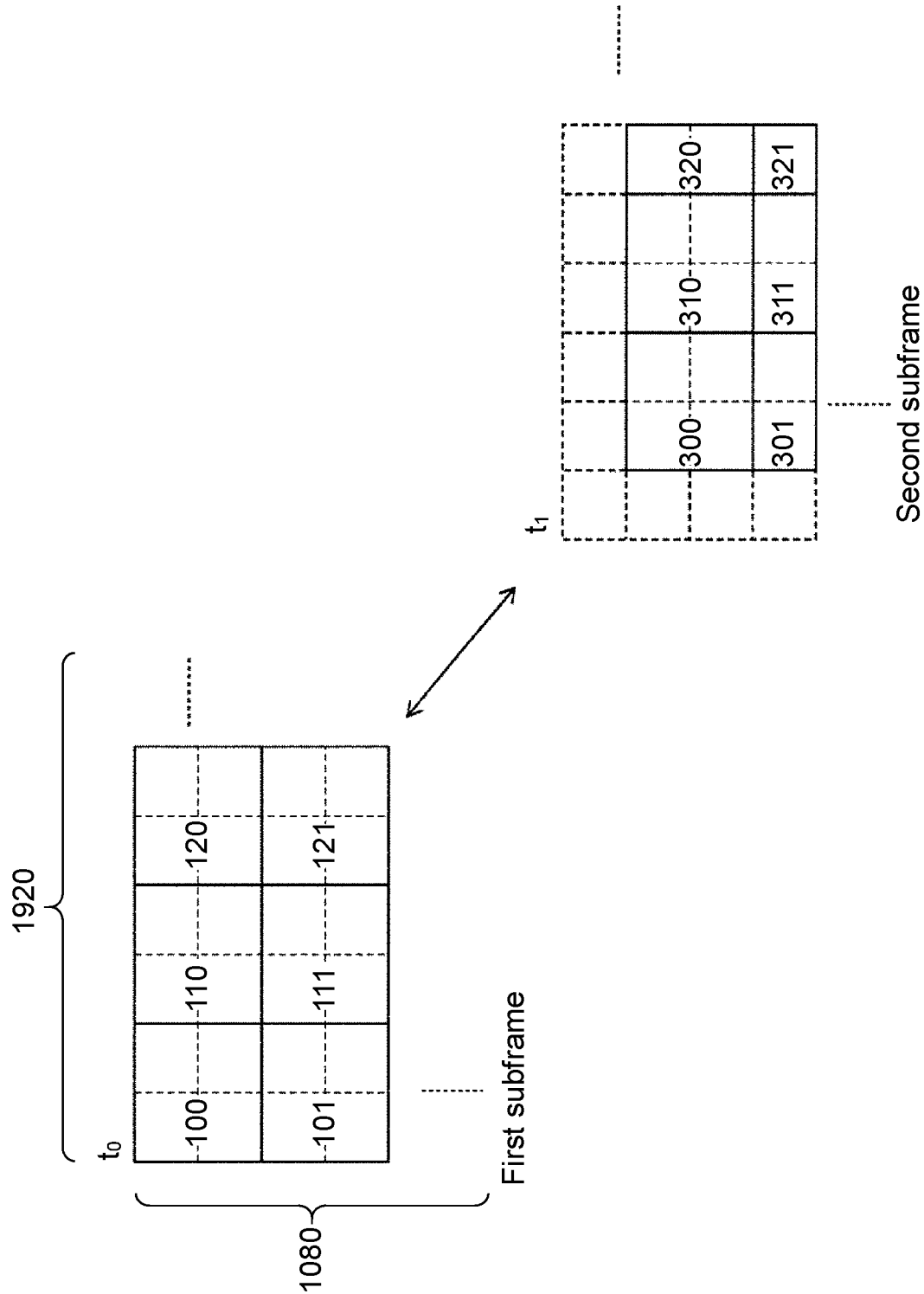
FIG. 9 is a front view of a subframe image for a double-density image generated from the input image signal in FIG. 8.

FIG. 8 is a schematic diagram illustrating a configuration example of an input image signal that is input to image processing circuit 420 in FIG. 2. FIG. 9 is a front view of a subframe image for a double-density image generated from the input image signal in FIG. 8. Hereinafter, a description is made of a concrete operation example of image processing circuit 420 in FIG. 2 using FIGS. 8 and 9.

Here, DMDs 240, 250, and 260 of projector 100 are capable of outputting an image of 1,920 pixels horizontally× 1,080 pixels vertically. By driving parallel plain-plate glass 400 using actuators 401a to 401d, setting is made to displace (shift) the projection position by ½ pixels horizontally and ½ pixels vertically. Here, displacing by ½ pixels (or by half a pixel) means moving a pixel by half a pitch between pixels.

FIG. 8 shows an input image signal that is a base for producing a subframe image in the image output system of projector 100, what is called a 4K2K image of 3,840 pixels horizontally×2,160 pixels vertically. The number of pixels of this input image signal is 4 times the number of pixels of DMDs 240, 250, and 260. This input image signal may be an image signal that is directly input from an external device, or may be a signal produced by upconverting an input image with lower resolution inside the system.

Next, a description is made of how to generate a subframe image signal by image signal processor 415.

FIG. 9 shows how to generate a subframe signal (resampling image signal) for two subframes by resampling at sampling positions different from each other from the 1-frame input image signal shown in FIG. 8. In the input image signal in FIG. 8, the column number of a pixel is given horizontally as 0, 1, 2, 3, 4, 5, . . . , and the line number of a pixel is given vertically as 0, 1, 2, 3, . . . .

Here, (1) A first subframe signal is defined as a signal obtained by sampling a pixel that has a remainder of 0 when X is divided by 2, where X is the relevant column number counted horizontally from column number 0; and that has a remainder of 0 when Y is divided by 2, where Y is the relevant row number counted vertically from row number 0.

(2) A second subframe signal is defined as a signal obtained by sampling a pixel that has a remainder of 1 when X is divided by 2, where X is the relevant column number counted horizontally from column number 0; and that has a remainder of 1 when Y is divided by 2, where Y is the relevant row number counted vertically from row number 0.

Figure 10:
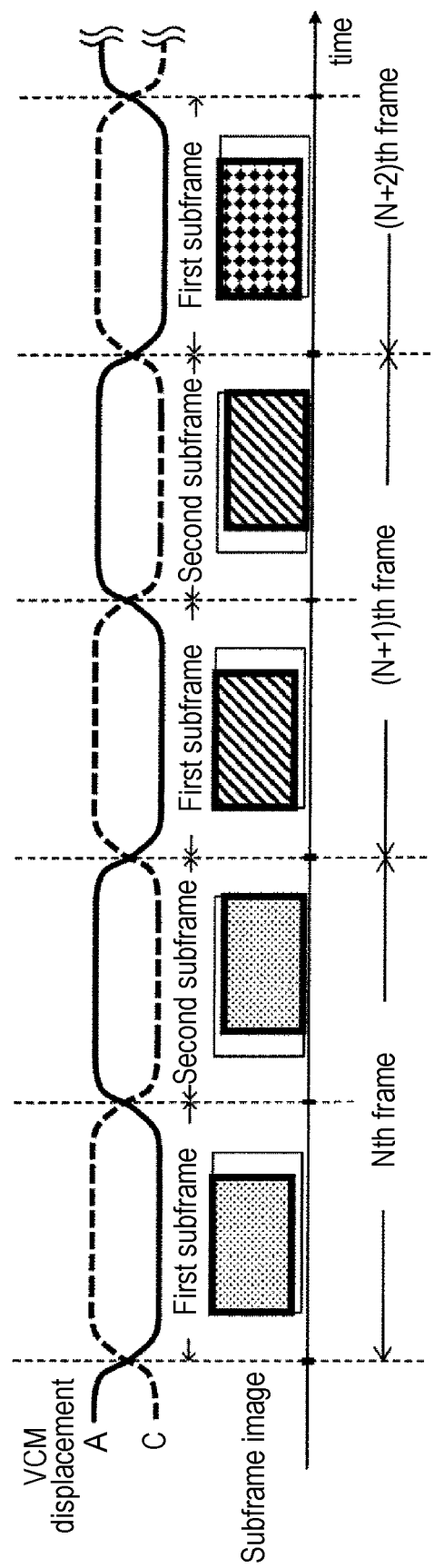
FIG. 10 is a front view of an image in a state where the subframe image in FIG. 9 has been pixel-shifted so as to make a double-density image.

FIG. 10 is a front view of an image in a state where the subframe image in FIG. 9 has been pixel-shifted so as to make a double-density image.

DMDs 240, 250, and 260 output two subframes at a speed twice the output frame rate. Concretely, when the output frame rate is assumed to be 60 Hz, the subframe is output at 120 Hz, and actuators 401a to 401d are driven at 60 Hz. FIG. 10 schematically illustrates displacement (VCM displacement) given to actuators 401a to 401d at this time and how the subframe image moves. In this case, as shown in FIG. 10, displacement A is directed to actuator 401a, and displacement C (reversed displacement A) is directed to actuator 401c. No displacement is directed to actuators 401b and 401d. This action causes parallel plain-plate glass 400 to swing with axis B-D being a rotation axis, which results in changing the optical path of input image light and projecting a first subframe image and a second subframe image deviated from each other by half a pixel.

Action of Outputting Quadruple-Density Image

Resampling processor 413 generates a subframe image signal for 4 subframes for each frame of an image signal having been input, corresponding to the movement of the projection position by parallel plain-plate glass 400 and actuators 401a to 401d.

The subframe image signal for 4 subframes generated by resampling processor 413 is sent to DMD driver 411, and a DMD drive signal is generated so as to output at a speed 4 times the output frame rate. Pixel shift controller 405 generates an actuator drive signal so that parallel plain-plate glass 400 is driven in synchronization with DMD driver 411 to move the projection position of pixels, and outputs the actuator drive signal to drive circuits 404a to 404d.

Figure 11:
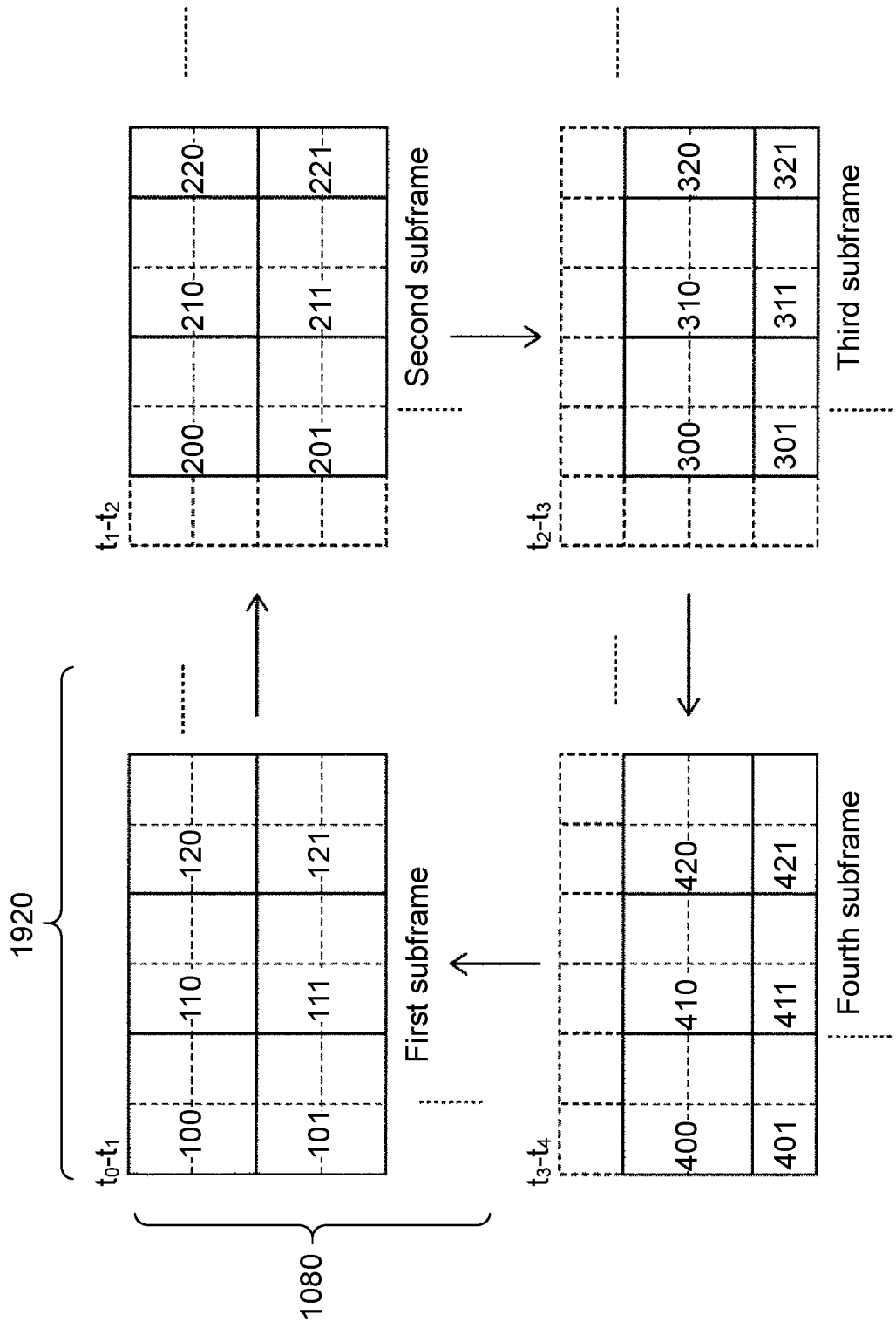
FIG. 11 is a front view of a subframe image for a quadruple-density image generated from the input image signal in FIG. 8.
Figure 12:
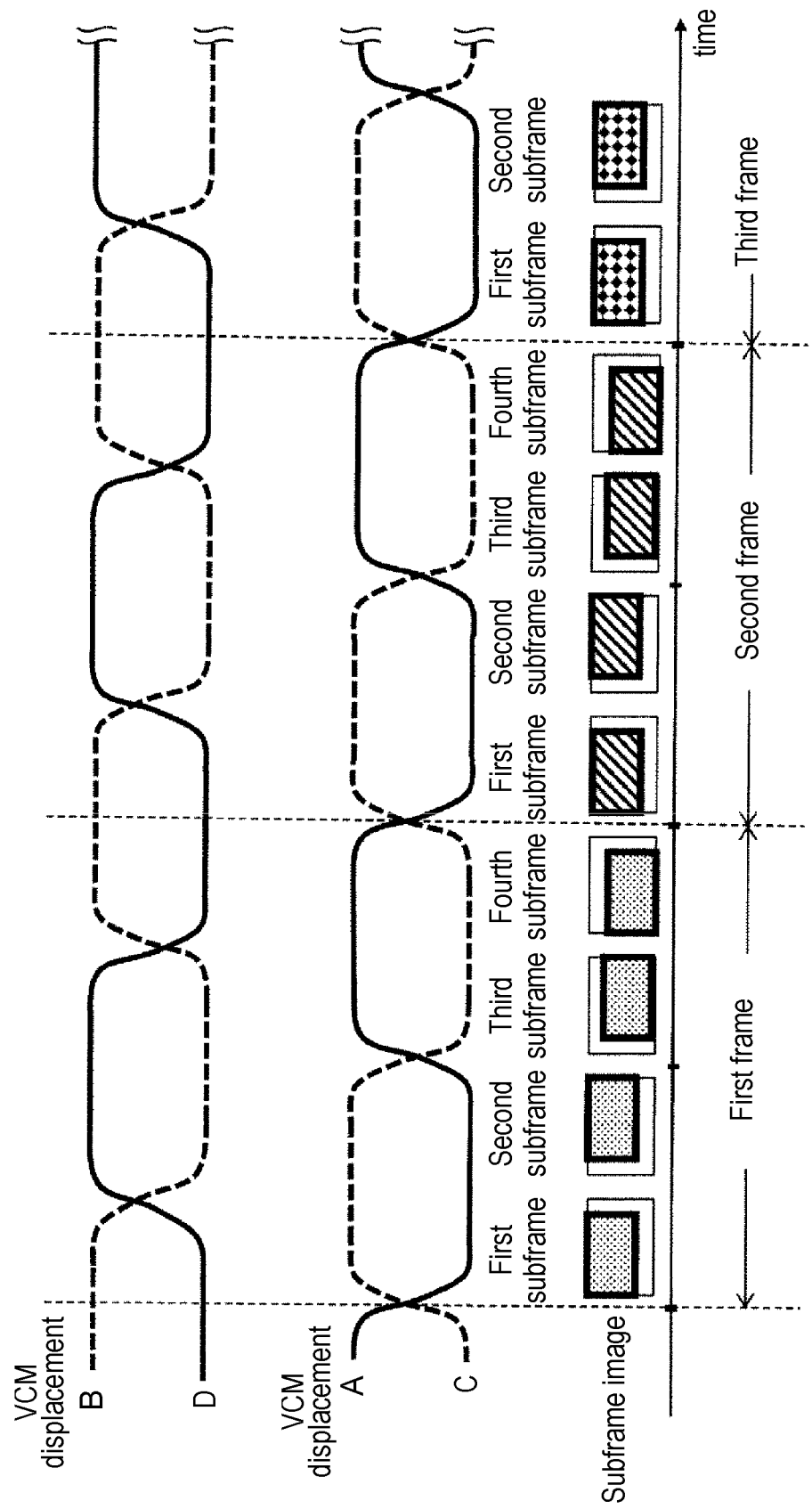
FIG. 12 is a front view of an image in a state where the subframe image in FIG. 9 has been pixel-shifted so as to make a quadruple-density image.

FIG. 11 is a front view of a subframe image for a quadruple-density image generated from the input image signal in FIG. 8. FIG. 12 is a front view of an image in a state where the subframe image in FIG. 9 has been pixel-shifted so as to make a quadruple-density image. In reference to FIGS. 11 and 12, a description is made of the action of the image output system in a case where the projection position can be moved in two directions. Note that the supported resolution of the display element and the resolution of an input image signal are the same as those described in the output action of a double-density image.

First, a description is made of how to generate a subframe signal in image signal processor 415. FIG. 11 illustrates how to produce a subframe signal (resampling image signal) for 4 subframes by resampling at sampling positions different from one another from the 1-frame input image signal shown in FIG. 8.

In the input image signal shown in FIG. 8, (1) A first subframe is defined as a signal obtained by sampling a pixel that has a remainder of 0 when X is divided by 2, where X is the relevant column number counted horizontally from column number 0; and that has a remainder of 0 when Y is divided by 2, where Y is the relevant row number counted vertically from row number 0.

(2) A second subframe is defined as a signal obtained by sampling a pixel that has a remainder of 1 when X is divided by 2, where X is the relevant column number counted horizontally from column number 0; and that has a remainder of 0 when Y is divided by 2, where Y is the relevant row number counted vertically from row number 0.

(3) A third subframe is defined as a signal obtained by sampling a pixel that has a remainder of 1 when X is divided by 2, where X is the relevant column number counted horizontally from column number 0; and that has a remainder of 1 when Y is divided by 2, where Y is the relevant row number counted vertically from row number 0.

(4) A fourth subframe is defined as a signal obtained by sampling a pixel that has a remainder of 0 when X is divided by 2, where X is the relevant column number counted horizontally from column number 0; and that has a remainder of 1 when Y is divided by 2, where Y is the relevant row number counted vertically from row number 0.

DMDs 240, 250, and 260 output 4 pieces of subframes at a speed 4 times the output frame rate. Concretely, when the output frame rate is assumed to be 60 Hz, the subframe is output at 240 Hz, and actuators 401a to 401d are driven at 60 Hz.

FIG. 12 schematically illustrates displacement (VCM displacement) given to actuators 401a to 401d and how the subframe image moves. In this case, displacement A is directed to actuator 401a, and displacement C (reversed displacement A) is directed to actuator 401c. Displacement B is directed to actuator 401b, and displacement D (reversed displacement B) is directed to actuator 401d. Then, the displacement waveform given to actuator 401a and actuator 401c is phase-shifted by 90° from the displacement waveform given to actuator 401b and actuator 401d. This action causes parallel plain-plate glass 400 to swing with axis B-D and axis A-C being rotation axes, which results in displacing the optical path of input image light horizontally and vertically and successively projecting first, second, third, and fourth subframe images, deviated from one another by half a pixel.

Pixel Shift Control Process

Figure 13:
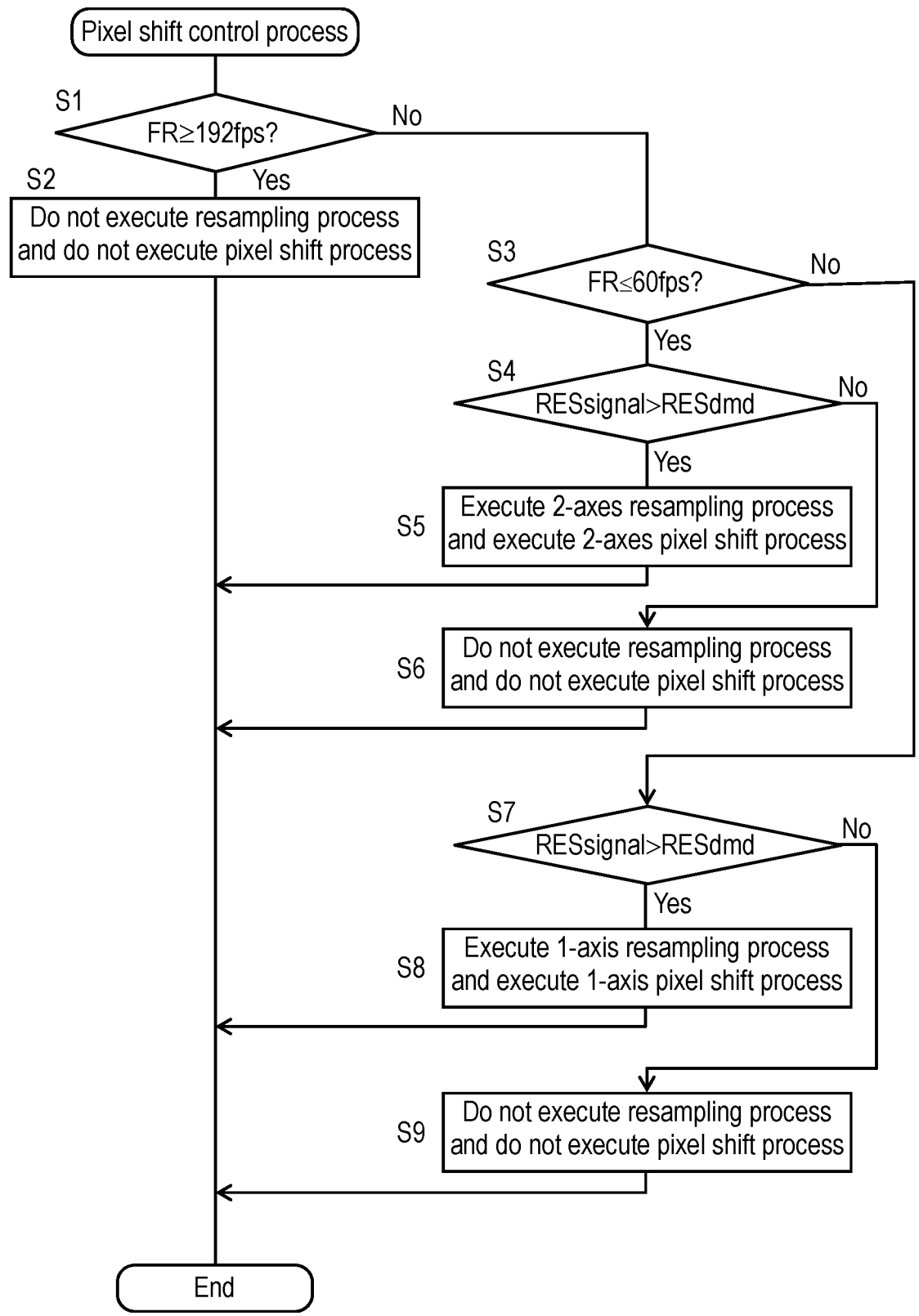
FIG. 13 is a flowchart illustrating the pixel shift control process executed by pixel shift controller 405 and control circuit 440 in FIG. 2.

FIG. 13 is a flowchart illustrating the pixel shift control process executed by pixel shift controller 405 and control circuit 440 in FIG. 2.

In step S1 in FIG. 13, determination is made whether FR≥192 fps, where FR is the frame rate of an input image signal. If yes, the flow proceeds to step S2; if no, to step S3. In step S2, resampling processor 413 is not made to execute the resampling process or the pixel shift process for parallel plain-plate glass 400 of optical element drive device 430, and the relevant pixel shift control process is completed.

In step S3, determination is made whether FR≥60 fps. If yes, the flow proceeds to step S4; if no, to step S7. In step S4, determination is made whether RESsignal>RESdmd, where RESsignal is the resolution (the number of pixels) of an input image signal, and RESdmd is the resolution (the number of pixels) of DMDs 240, 250, and 260. If yes, the flow proceeds to step S5; if no, to step S6. In step S5, resampling processor 413 is made to execute the 2-axes resampling process and at the same to execute pixel shift about the two axes for parallel plain-plate glass 400 of optical element drive device 430, and the relevant pixel shift control process is completed. Meanwhile, in step S6, resampling processor 413 is not made to execute the resampling process or the pixel shift process for parallel plain-plate glass 400 of optical element drive device 430, and the relevant pixel shift control process is completed.

In step S7, determination is made whether RESsignal>RESdmd, where RESsignal is the resolution (the number of pixels) of an input image signal, and RESdmd is the resolution (the number of pixels) of DMDs 240, 250, and 260. If yes, the flow proceeds to step S8; if no, to step S9. In step S8, resampling processor 413 is made to execute the 1-axis resampling process and at the same to execute the 1-axis resampling process for parallel plain-plate glass 400 of optical element drive device 430, and the relevant pixel shift control process is completed. Meanwhile, in step S9, resampling processor 413 is not made to execute the resampling process or the pixel shift process for parallel plain-plate glass 400 of optical element drive device 430, and the relevant pixel shift control process is completed.

Here, 60 fps corresponds to the first threshold of a frame rate; 192 fps, the second threshold. The present disclosure is not limited to these values, but the first and second thresholds may be otherwise as long as they keep their magnitude relationship.

Effects and Advantages of Embodiment

Figure 14:
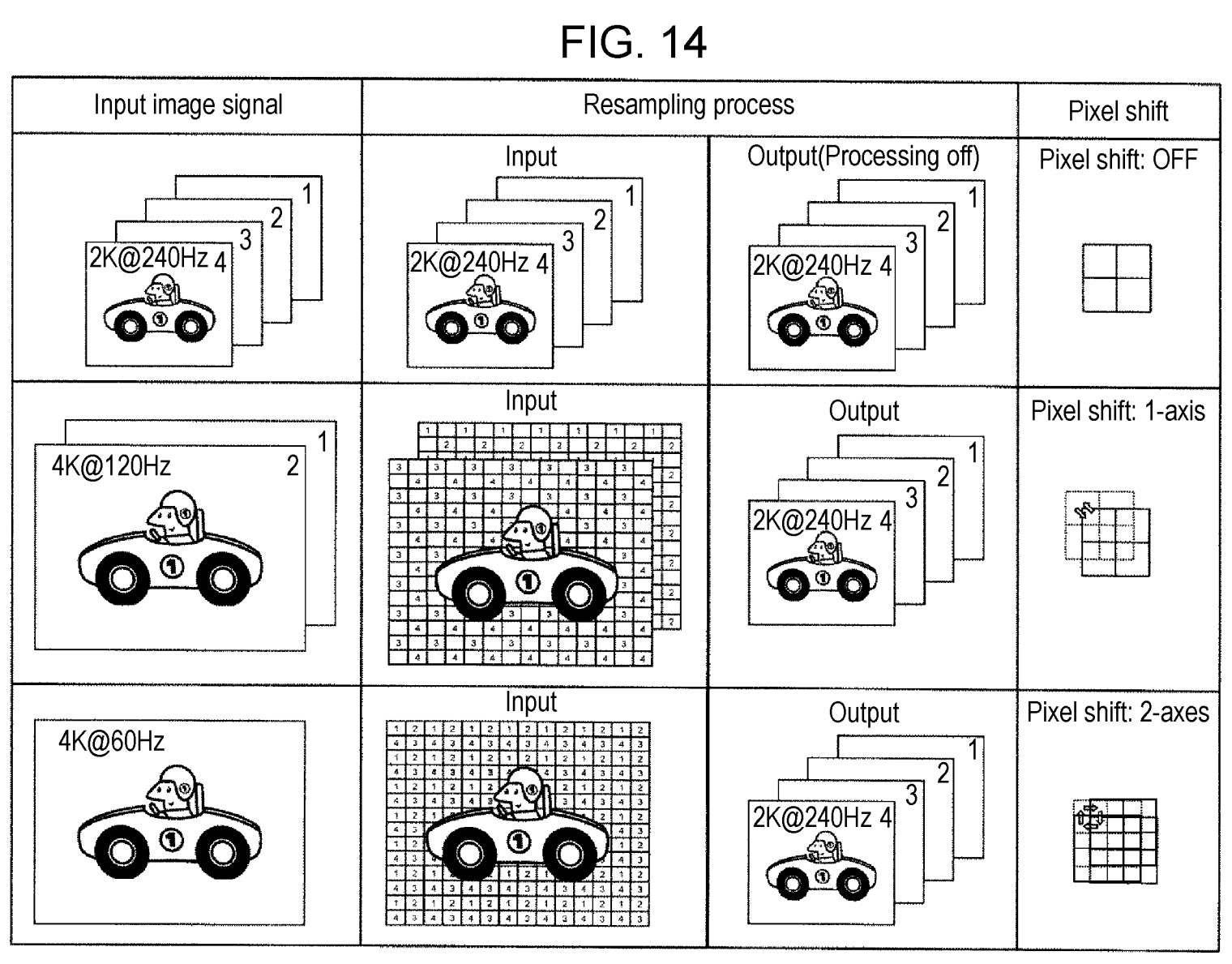

FIG. 14 is a tabular-form schematic diagram illustrating an execution example of the pixel shift control process in FIG. 13.

In step S5 in FIG. 13, if the number of pixels of an input image signal is larger than those of DMDs 240, 250, and 260 and at the same time frame rate FR is 60 Hz or lower (an example of the first case), an image with a high resolution can be projected under control of pixel shift about the two axes control.

In step S8 in FIG. 13, if the number of pixels of an input image signal is larger than those of DMDs 240, 250, and 260, and at the same time frame rate FR is higher than 60 Hz and lower than 193 Hz (e.g., between 96 Hz and 120 Hz shown in table 1, an example of the second case), a smooth image with a high resolution can be projected under controlling of pixel shift about one axis.

In step S2 in FIG. 13, if frame rate FR of an input image signal is 192 Hz or higher, or in a case other than those described above, a smooth image can be projected by turning off the pixel shift process.

Owing to the above process, an optimum image can be projected for various types of image signals.

As described above, according to the embodiment, the transparent parallel plain plate is selectively controlled to perform one of the following for image light in response to the number of pixels and frame rate of an input image signal for image light: no pixel shift, 1-axis pixel shift, or 2-axes pixel shift. This control prevents an unnatural image from being displayed even if the motion speed and/or the spatial frequency change depending on a scene.

MODIFICATION EXAMPLE

In the above-described embodiment, DMDs 240, 250, and 260 are used as an example of an image display element. The present disclosure, however, is not limited to this case but another type of image display element may be used.

Hereinbefore, the embodiment is described to exemplify the technology disclosed in this application. For this reason, the accompanying drawings and detailed descriptions are provided.

Accordingly, some components described in the detailed description and accompanying drawings may include, besides what is essential for solving problems, what is not essential in order to exemplify the above-described technologies. Hence, the fact that such inessential components are included in the detailed descriptions and accompanying drawings does not mean that such inessential components are immediately acknowledged as essential.

The above-described embodiment is for exemplification of the technologies in the disclosure. Hence, the embodiment may undergo various kinds of change, substitution, addition, and/or omission within the scope of the claims and their equivalent technology.

The present disclosure is applicable to a projection image apparatus that shifts the display position of pixels to display a projection image with a high resolution.

What is claimed is:

1. A projection image apparatus comprising:
   an image display element that modulates illumination light from a light source according to an input image signal to generate image light,
   a transparent parallel plain plate that is swing-drive-controlled about one or two of two axes orthogonal to each other, the transparent parallel plain plate changing an optical path of the image light from the image display element to perform pixel shift about the one or two of the two axes for the image light,
   a projection optical system that enlarge-projects the image light having passed through the transparent parallel plain plate,
   a resampling processor that performs resampling process for the input image signal, and
   a controller that selectively executes one of following three actions in response to a number of pixels and a frame rate of the input image signal:
   (1) causing the resampling processor to avoid the resampling process for the input image signal and also causing the transparent parallel plain plate to avoid the pixel shift for the image light,
   (2) making the resampling processor execute the resampling process related to pixel shift about the one axis for the input image signal and also controlling the transparent parallel plain plate to perform pixel shift about the one axis for the image light, and
   (3) making the resampling processor execute the resampling process related to pixel shift about the two axes for the input image signal and also controlling the transparent parallel plain plate to perform pixel shift about the two axes for the image light,
   wherein the controller makes the resampling processor execute the resampling process related to the pixel shift about the two axes for the input image signal and also controls the transparent parallel plain plate to perform the pixel shift about the two axes for the image light in a first case in which the number of pixels of the input image signal is larger than a number of pixels of the image display element and also the frame rate of the input image signal is a given first threshold or lower,
   wherein the controller makes the resampling processor execute the resampling process related to the pixel shift about the one axis for the input image signal and also controls the transparent parallel plain plate to perform the pixel shift about the one axis for the image light in a second case in which the number of pixels of the input image signal is larger than the number of pixels of the image display element and also the frame rate of the input image signal is higher than the given first threshold and lower than a given second threshold larger than the given first threshold, and
   wherein the controller causes the resampling processor to avoid the resampling process for the input image signal and also causes the transparent parallel plain plate to avoid the pixel shift for the image light in a case other than the first case and the second case.

2. The projection image apparatus of claim 1, wherein the given first threshold is 60 fps and the given second threshold is 192 fps.

3. A method of controlling a projection image apparatus including
   an image display element that modulates illumination light from a light source according to an input image signal to generate image light,
   a transparent parallel plain plate that is swing-drive-controlled about one or two of two axes orthogonal to each other, the transparent parallel plain plate changing an optical path of the image light from the image display element to perform pixel shift about the one or two of the two axes for the image light,
   a projection optical system that enlarge-projects the image light having passed through the transparent parallel plain plate,
   a resampling processor that performs resampling process for the input image signal, and
   a controller that controls the transparent parallel plain plate and the resampling processor,
   the method comprising a step in which the controller selectively executes one of following three actions in response to a number of pixels and a frame rate of the input image signal:
   (1) causing the resampling processor to avoid the resampling process for the input image signal and also causing the transparent parallel plain plate to avoid the pixel shift for the image light,
   (2) making the resampling processor execute the resampling process for the input image signal related to pixel shift about the one axis and also controlling the transparent parallel plain plate to perform pixel shift about the one axis for the image light, and
   (3) making the resampling processor execute the resampling process related to pixel shift about the two axes for the input image signal and also controlling the transparent parallel plain plate to perform pixel shift about the two axes for the image light,
   wherein the step includes following actions:
   (1) the controller making the resampling processor execute the resampling process related to the pixel shift about the two axes for the input image signal and also controlling the transparent parallel plain plate to perform the pixel shift about the two axes for the image light in a first case in which the number of pixels of the input image signal is larger than the number of pixels of the image display element and also the frame rate of the input image signal is a given first threshold or lower,
   (2) the controller making the resampling processor execute the resampling process related to the pixel shift about the one axis for the input image signal and also controlling the transparent parallel plain plate to perform the pixel shift about the one axis for the image light in a second case in which the number of pixels of the input image signal is larger than the number of pixels of the image display element and also the frame rate of the input image signal is higher than the given first threshold and lower than a given second threshold larger than the given first threshold, and
   (3) the controller causing the resampling processor to avoid the resampling process for the input image signal and also causing the transparent parallel plain plate to avoid the pixel shift for the image light in a case other than the first case and the second case.

4. The method of controlling a projection image apparatus of claim 3, wherein the given first threshold is 60 fps and the given second threshold is 192 fps.

* * * * *